United States Patent [19]
Hatori

[11] Patent Number: 5,816,376
[45] Date of Patent: Oct. 6, 1998

[54] FLUID CLUTCH

[75] Inventor: Mitsuaki Hatori, Itoh, Japan

[73] Assignee: Usui Kokusai Sangyo Kaisha Limited, Japan

[21] Appl. No.: 748,473

[22] Filed: Nov. 8, 1996

[30] Foreign Application Priority Data

Nov. 10, 1995 [JP] Japan .................................. 7-317108

[51] Int. Cl.$^6$ .................................................. F16D 35/02
[52] U.S. Cl. ........................................ 192/58.61; 192/58.7
[58] Field of Search ............................. 192/58.61, 58.6, 192/58.5, 58.7, 58.4, 58.2

[56] References Cited

U.S. PATENT DOCUMENTS

| | | | |
|---|---|---|---|
| 3,642,105 | 2/1972 | Kikuchi .................................. | 192/58 B |
| 4,246,995 | 1/1981 | Gee ........................................ | 192/58.61 |
| 4,305,491 | 12/1981 | Rohrer .............................. | 192/58.63 X |
| 4,351,425 | 9/1982 | Bopp ..................................... | 192/58.61 |
| 4,351,426 | 9/1982 | Bopp ..................................... | 192/58.61 |
| 4,796,571 | 1/1989 | Ono et al. ............................. | 123/41.12 |
| 4,846,331 | 7/1989 | Ono ....................................... | 192/58 B |
| 4,850,465 | 7/1989 | Ono ....................................... | 192/58 B |
| 4,903,643 | 2/1990 | Takikawa et al. .................... | 123/41.12 |
| 4,903,805 | 2/1990 | Ono ....................................... | 192/58 B |
| 4,909,367 | 3/1990 | Elmer .................................... | 192/58.62 |
| 4,930,458 | 6/1990 | Takikawa et al. .................... | 123/41.12 |
| 4,987,986 | 1/1991 | Kennedy et al. ..................... | 192/58.61 |
| 5,018,612 | 5/1991 | Takikawa et al. .................... | 192/58 B |
| 5,060,774 | 10/1991 | Takikawa et al. .................... | 192/58 A |
| 5,090,533 | 2/1992 | Inoue .................................... | 192/58 B |
| 5,101,949 | 4/1992 | Takikawa et al. .................... | 192/58 B |
| 5,109,965 | 5/1992 | Inoue .................................... | 192/58 B |
| 5,119,920 | 6/1992 | Inoue .................................... | 192/58 B |
| 5,125,491 | 6/1992 | Takikawa et al. .................... | 192/58 B |
| 5,139,125 | 8/1992 | Takikawa et al. .................... | 192/58 B |
| 5,232,074 | 8/1993 | Watanabe ............................. | 192/58 B |
| 5,452,782 | 9/1995 | Inoue . | |
| 5,501,183 | 3/1996 | Takayama . | |

FOREIGN PATENT DOCUMENTS

| | | | |
|---|---|---|---|
| 54-25581 | 8/1979 | Japan . | |
| 55-76226 | 6/1980 | Japan . | |
| 57-1829 | 1/1982 | Japan .................................. | 192/82 T |
| 57-167533 | 10/1982 | Japan . | |
| 57-179431 | 11/1982 | Japan . | |
| 59-27452 | 7/1984 | Japan . | |
| 62-124330 | 6/1987 | Japan . | |
| 62-194038 | 8/1987 | Japan .................................. | 192/58 B |
| 63-182332 | 11/1988 | Japan . | |
| 258529 | 9/1992 | Japan . | |

Primary Examiner—Rodney H. Bonck
Assistant Examiner—William C. Joyce
Attorney, Agent, or Firm—Anthony J. Casella; Gerald E. Hespos; Ludomir A. Budzyn

[57] ABSTRACT

A fluid clutch which is structurally simplified to lower its cost and enabled to stabilize its action by optimizing the arrangement of an electromagnetic valve and to have a long lifetime by preventing a premature deterioration of a bearing or the like. The inside of a sealed case 2, in which a drive disc 3 fixed on a rotary shaft 1 is accommodated and made rotatably on the rotary shaft 1, is divided by a partition 5 into a torque transmission chamber 4 and an oil supply chamber 6, so that the drive torque of the drive disc 3 is transmitted to the sealed case 2 by the oil to be fed from the oil supply chamber 6 to the torque transmission chamber 4. Midway of a discharge passage 7 for feeding the oil, as recovered by a dam mechanism, from the torque transmission chamber 4 to the oil supply chamber 7, a passage controlling electromagnetic valve 10 is arranged coaxially with the rotary shaft 1.

10 Claims, 2 Drawing Sheets

FLUID CLUTCH

BACKGROUND OF THE INVENTION

1. Field of the Invention

The present invention relates to a fluid clutch for transmitting the drive torque of a drive disc to a case through the oil fed to a torque transmission chamber and, more particularly, to a fluid clutch for rotationally controlling an automotive engine cooling fan.

2. Description of the Prior Art

In a general fluid clutch for rotationally controlling the cooling fan of an internal combustion engine for a vehicle, the drive torque of a drive disc is transmitted to a case through the oil or silicone oil, as fed to a torque transmission chamber. In the known structure of a coupling system (or the fluid clutch) (as disclosed in Japanese Patent Publication No. 21048/1988), the inside of a sealed case is divided by a partition into a torque transmission chamber and an oil reserving chamber, and a drive disc is so mounted in the torque transmission chamber that it can be rotated by the drive of a drive unit. The oil in the oil reserving chamber is fed to the torque transmission chamber through an outflow adjusting port formed in the partition. On the other hand, the oil in the torque transmission chamber is so pumped by a dam mechanism, which is mounted in the inner circumferential wall of the sealed case, as confronting the outer circumference of the drive disc, that it is returned to the oil reserving chamber via a circulation passage.

According to the fluid clutch of this kind, the drive torque of the drive disc is transmitted through the oil, as fed from the oil reserving chamber to the torque transmission chamber, so that the fan, as mounted on the case, is rotated to cool down the automotive engine, for example. In this fluid clutch, moreover, the ambient temperature is detected by a bimetal to increase the degree of opening of the outflow adjusting port, when the temperature rise is detected, thereby to raising the torque transmission force so that the number of revolution of the case may be increased to rotate the fan at a high speed thereby to enhance the cooling effect.

However, the automotive engine is run under a variety of conditions. During the run on an express highway, for example, the drive disc is rotated at a high speed, but the cooling effect is enhanced by the coming wind so that the fan need not be rotated at the high speed. At the time of a cold start, on the other hand, the warming-up is retarded by the large number of revolution of the fan, and the fan itself is desired to rotate at a low speed so as to suppress its noise. Thus, there is desired according to each case such a control as can prevent the overshoot of the cooling water temperature of the engine and can hold the water temperature at a substantially constant level. It is insufficient for this demand to control the oil flow exclusively according to the ambient temperature.

We, therefore, have proposed a fluid clutch (as disclosed in Japanese Patent Laid-Open No. 258529/1992) for adjusting the oil flow highly accurately for a proper control in accordance with the various operation conditions.

This fluid clutch is equipped with a pair of electromagnetic valves which are turned ON/OFF or proportionally controlled to control the oil flow to the torque transmission chamber on the basis of the cooling water temperature of the engine, the number of revolution of the engine and the number of revolution of the fan. In accordance with a variety of drive conditions, the drive torque of the drive disc can always be properly transmitted to the sealed case to effect the optimum clutch operation under the various drive conditions. Thus, the fluid clutch can expect many effects to lower the fan noise, to economize the fuel, to improve the accelerating performance and to shorten the warming-up time period.

Despite of these effects, however, the present invention is defective in the complicated structure to raise the cost, and a centrifugal force is applied to the electromagnetic valve itself to make the operations unstable. Another defect is that the weight is increased to load the bearing thereby to shorten the lifetime of the bearing.

SUMMARY OF THE INVENTION

The present invention has been conceived to eliminate the above-specified defects and contemplates to provide a fluid clutch which is enabled to lower the cost by simplifying the structure, to stabilize the operations by arranging an electromagnetic valve properly and to have a longer lifetime by preventing the premature deterioration of a bearing or the like.

According to the present invention, there is provided a fluid clutch in which the inside of a driven side sealed case, as borne by a bearing on a rotary shaft fixing a drive disc on the leading end of a drive portion, is divided by a partition into an oil supply chamber and a torque transmission chamber accommodating the drive disc, in which there is provided an oil discharge passage for discharging to the oil supply chamber the oil recovered by a dam mechanism mounted on the inner circumference of the sealed case, as confronting the outer circumferential wall of the drive disc, and in which the recovered oil is fed from the oil supply chamber through an oil discharge port of the partition to the torque transmission chamber thereby to transmit the drive torque of the drive disc to the sealed case. The fluid clutch is characterized in that an electromagnetically acting passage control valve is arranged coaxially with the rotary shaft between the discharge passage for feeding the oil, as recovered by the dam mechanism of high discharge capacity, from the torque transmission chamber to the oil supply chamber, and the oil supply chamber for feeding the recovered oil to the torque transmission chamber. The fluid clutch is further characterized in that bypass means is interposed between the oil discharge passage and the oil supply chamber for allowing the oil to flow out slightly. The fluid clutch is further characterized in that the passage control valve is a duty type solenoid valve, an ON/OFF control type solenoid valve or a linear control type solenoid valve.

In the present invention, the outflow by the dam mechanism of high discharge capacity, as mounted on the inner circumference of the case, is controlled by the passage control valve, and the discharge port of small diameter, as always opened to feed such a small amount of oil as to be instantly discharged by the dam mechanism to the torque transmission chamber, is formed in the partition. The control means for the passage control valve can be exemplified by a system for controlling the operations of the passage control valve by making use of sensors for detecting the temperature of the cooling water of the drive unit, the number of revolution of the engine and the number of revolution of the case, and a control unit such as a CPU.

The passage control valve is closed when no control signal is outputted from the sensors and the control unit, so that the communication between the oil supply chamber and the oil discharge passage is cut off. When the control signals are outputted, the control valve is opened to send the oil from the oil discharge passage to the oil supply chamber so that it is gradually fed from the oil supply chamber to the torque transmission chamber. The oil in this torque transmission chamber is circulated to return via the oil discharge passage to the oil supply chamber by the dam mechanism having the desired high discharge capacity.

At an abrupt acceleration or at the start, the control valve is continuously opened to its full stroke so that the oil in the oil discharge passage is quickly fed to the oil supply chamber whereas the oil in the torque transmission chamber is instantly discharged and recovered to the oil discharge passage by the dam mechanism of high discharge capacity. As a result, the number of revolution of the cooling fan instantly drops to provided the effects for the reduction in the fan noise, the economy of the fuel and the improvement in the accelerating performance.

Under a normal running condition, on the other hand, as the passage control valve is actuated to begin opening by the control unit, the oil is fed from the oil discharge passage to the oil supply chamber, and the oil in the torque transmission chamber is discharged at a high rate from the oil discharge passage by the dam mechanism of high discharge capacity so that the number of revolution of the case (or the cooling fan) is reduced. When the control valve is closed, on the other hand, the oil flow from the oil discharge passage to the oil supply chamber reduces so that the oil coming from the torque transmission chamber accumulates in the oil discharge chamber. As a result, the pressure of the oil is raised by the pumping function of the dam mechanism, but any more oil is not fed from the torque transmission chamber to the oil discharge passage, but the amount of oil in the torque transmission chamber gradually increases to raise the number of revolution of the case (or the cooling chamber) gradually.

Incidentally, in order that the oil such as silicone oil may be prevented from being deteriorated by the heat coming from the shearing action, the control valve is not completely closed but allows the oil to flow slightly into the oil supply chamber even at the highest rotation of the cooling fan. As this means, here can be suitably adopted either the mechanical means, in which a bypass passage is formed to extend from the entrance of the control valve to the oil supply chamber or in which a clearance for allowing a slight leakage of oil is formed in a seat face to be seated by the control valve, or electric means for controlling the current of a coil, in which the control valve is exemplified by a linear control type solenoid valve such that a small clearance is established, when the solenoid valve is closed, between this valve and the seat face or in which the control valve is exemplified by a duty type solenoid valve such that the solenoid valve is instantly opened by changing its duty ratio.

In the present invention, moreover, the dam mechanism to be mounted on the inner circumference at the sealed case, as confronting the outer circumferential wall of the drive disc, is formed to have a generally U-shaped or L-shaped section. This is because the pumping function of the dam is drastically enhanced to raise the oil recovery capacity (or discharge capacity).

Moreover, the passage control valve is arranged coaxially with the rotary shaft of the drive disc so that the rotational balance of the fluid clutch may be well balanced. This passage control valve may suitably be exemplified by the duty type solenoid valve which either controls the duty ratio capable of changing the ratio between the open valve time period and the closed valve time period within 0 to 100% or changes the frequency, but can be exemplified by an ON/OFF control solenoid valve or the linear control solenoid valve. This passage control valve is rotatably arranged in the sealed case so as to lighten the load to be applied to the bearing of the fluid clutch. Incidentally, the control valve block having the passage control valve is so constructed that it is supported at the car body, but may be attached to the sealed case or can adopt the system in which the power supply to the control valve is effected in the non-contact manner or in which the coil is supported at the outside whereas the valve member and the spring are packaged in the sealed case.

DETAILED DESCRIPTION OF THE PREFERRED EMBODIMENTS

Figure 1:
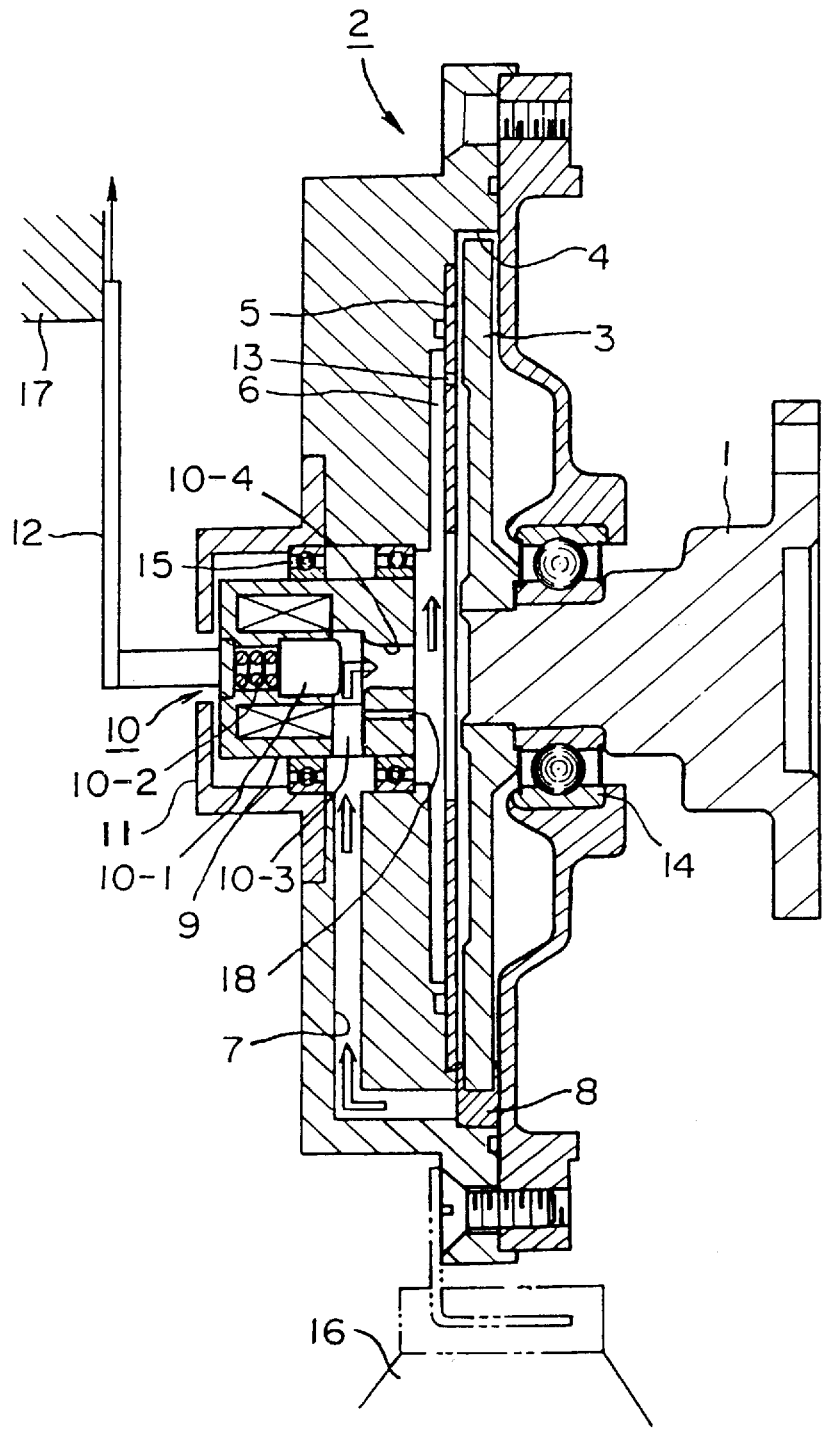
FIG. 1 is a longitudinally sectional side elevation showing an embodiment of the structure of a fluid clutch according to the present invention.

FIG. 1 is a longitudinally sectional side elevation showing an embodiment of the construction of a fluid clutch according to the present invention. Reference numeral 1 designates a rotary shaft connected directly to a drive unit such as an engine; numeral 2 a sealed case; numeral 3 a drive disc; numeral 4 a torque transmission chamber; numeral 5 a partition; numeral 6 an oil supply chamber; numeral 7 an oil discharge passage; numeral 8 a dam; numeral 9 a control valve block; numeral 10 a passage controlling electromagnetic valve; numeral 11 a housing; numeral 12 a stay; numeral 13 an oil discharge port; numerals 14 and 15 bearings; numeral 16 a cooling fan; numeral 17 a car body; and numeral 18 a bypass passage.

In the fluid clutch according to the present invention, more specifically, the sealed case 2 having a large diameter and a small length is rotatably mounted through the bearing 14 on the rotary shaft 1 which is rotated by the drive of the (not-shown) drive unit such as the engine. The inside of this sealed case 2 is divided into the torque transmission chamber 4 and the oil supply chamber 6. In the torque transmission chamber 4, there is so accommodated the disc-shaped drive disc 3 which is fixed on the end portion of the rotary shaft 1 that a torque transmission clearance may be formed between the drive disc 3 and the inner circumference of the torque transmission chamber 5. On the inner circumference of the sealed case, as confronting the outer circumferential wall of the drive disc 3, there is mounted the dam 8 which has a generally U-shaped or L-shaped section and a high discharge capacity. The control valve block is so interposed coaxially with the rotary shaft of the drive disc between the oil discharge passage 7 and the oil supply chamber 6 that is made rotatable relative to the sealed case 2 through the bearing 15. The control valve block is supported on the car body 17 by the stay 12.

In the passage controlling electromagnetic valve 10 as assembled in the control valve block 9, a valve member 10-1 is so urged by a spring 10-2 as to close the entrance 10-3 and the exit 10-4 of the valve 10 ordinarily (or when turned OFF). When the valve member 10-1 is actuated (or when turned ON), the communication between the entrance 10-3 and the exit 10-4 is established, as shown, so that the oil in the oil discharge passage 7 flows into the oil supply chamber 6 and further into the torque transmission chamber 4 from the oil discharge port 13 formed in the partition 5. Incidentally, when a duty type solenoid valve or an ON/OFF control type solenoid valve is adopted as the passage controlling electromagnetic valve 10, the flow to the oil supply chamber can be controlled by changing the open time period of the valve member 10-1 arbitrarily. When a linear solenoid valve is adopted, on the other hand, the opening/closing operation of the valve member 10-1 can be stopped in an arbitrary position to control the passage (or opening) area, as desired.

As described above, the control valve block 9, as having the passage controlling electromagnetic valve 10, is supported through the stay 12 by the car body 17 and is controlled by the (not-shown) CPU mounted on the car body. Despite of this arrangement, however, the control valve block 9 may be modified such that it is fixed on the front face of the sealed case 2, such that the power supply to the electromagnetic type 10 is of the non-contact type, or such that the oil is supported at the outside whereas the valve member and the spring are mounted in the sealed case. Incidentally, the CPU is constructed to send valve control commands on the basis of the output signals from sensors for detecting the water temperature of the cooling water of the drive unit, the number of revolution of the engine, the number of revolution of the case and the throttle opening.

With the construction thus far described, when when the electromagnetic valve control command is sent from the CPU to energize the solenoid type electromagnetic valve 10, this electromagnetic valve 10 acts in an opening direction to establish the communication between the oil supply chamber 6 and the oil discharge passage 7 so that the oil is fed from the oil discharge passage 7 to the oil supply chamber 6. As a result, the oil in the torque transmission chamber 4 is discharged in a large amount from the oil discharge passage 7 by the action of the dam mechanism 8 having a high discharge capacity so that the number of revolution of the case (or the cooling fan) decreases (at this time, the oil in the oil supply chamber 6 begins to be gradually fed from the oil discharge port 13 of the partition 5 to the torque transmission chamber 4). As the amount of the oil to reside in the torque transmission chamber 4 thus decreases, the torque transmission power by the oil in the torque transmission chamber 4 drops to lower the number of revolution of the sealed case 2 thereby to decelerate the cooling fan 16.

When the power supply to the solenoid type electromagnetic valve 10 is interrupted, on the contrary, the electromagnetic valve 10 acts in the closing direction to reduce the oil flow from the oil discharge passage 7 to the oil supply chamber 6 so that the oil from the torque transmission chamber 4 is accumulated in the oil discharge passage 7. The oil pressure is raised by the pumping function of the dam mechanism 8, but the oil cannot be fed any more to the oil discharge passage 7 from the torque transmission chamber 4. As a result, the amount of oil in the torque transmission chamber 4 increases to raise the torque transmission force so that the number of revolution of the sealed case 2 increases to accelerate the cooling fan 16. In this case, the passage control electromagnetic valve 10 is fully closed so as to prevent the deterioration due to the heat of the oil, but a small amount of oil is allowed to flow from the entrance 10-3 to the oil supply chamber 6 by the bypass passage 18.

Figure 2:
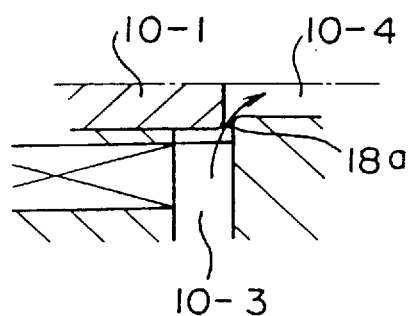
FIG. 2 is an enlarged section showing a portion of another embodiment of the bypass means to be used in the fluid clutch of the present invention.
Figure 3:
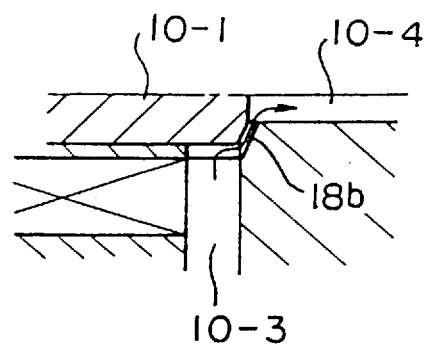
FIG. 3 is an enlarged section showing a portion of still another embodiment of the bypass means to be used in the fluid clutch of the present invention.

The bypass means for preventing the deterioration due to the heat of the oil can be exemplified not only by the aforementioned bypass means but also by the construction, in which a small clearance 18a for the bypass is established between the valve member 10-1 and the seat face to be seated by the valve member by using a linear control type solenoid valve, as shown in FIG. 2, to control the current of the solenoid valve, in which a groove 18b is formed for the bypass in the seat face to be seated by the valve member 10-1, as shown in FIG. 3, or in which the passage control electromagnetic valve 10 is embodied by a duty type solenoid valve so that it is instantly released for the bypass by changing its duty ratio.

Since the oil recovery capacity is drastically enhanced by the U-shaped or L-shaped dam mechanism 8 in accordance with the present invention, the oil in the torque transmission chamber 4 is promptly discharged, even if left much, by the dam mechanism 8 even at the start or at the abrupt acceleration during the run, so that the number of revolution of the cooling fan 16 drops to lower the noise and to prevent the useless fuel consumption. Since the amount of oil circulation increases, on the other hand, the time period for the oil to reside on the torque transmission face can be shortened to prevent the rise of the oil temperature.

Incidentally, the factors for controlling the oil flow to the torque transmission chamber can be exemplified not only by the water temperature of the cooling water of the drive unit, the number of revolution of the engine and the number of revolution of the case but also by the coming wind, the ambient temperature, the intake temperature, the vehicle speed, the throttle opening, the presence or absence of an abrupt acceleration, the atmospheric pressure, the presence or absence of a knocking, the state of the air conditioner or the exhaust brake state.

As has been described hereinbefore, the fluid clutch according to the present invention can achieve the effects, as will be enumerated in the following.

(1) Thanks to the ability of discharging the oil promptly from the torque transmission chamber by enhancing the pumping function of the dam drastically, the oil, even if much left in the torque transmission chamber, is quickly discharged by the dam even at the start or at an abrupt acceleration during the run, and the number of revolution of the cooling fan is decreased to reduce the fan noise and to improve the mileage.

(2) Thanks to the increase in the oil circulation, the time period for the oil to reside on the torque transmission face can be shortened to prevent the rise in the oil temperature so that the premature deterioration of the oil or the bearings can be prevented to elongate the lifetime.

(3) Thanks to the arrangement of the passage control valve on the axis common to the rotary shaft of the drive disc, the action of the passage control valve is stabilized to balance the rotation of the fluid clutch remarkably excellently.

(4) Thanks to the rotatable arrangement of the passage control valve relative to the sealed case, the load to be applied to the bearings of the fluid clutch can be lightened to improve the durability of the bearings.

(5) Thanks to the support of the control unit for controlling the passage control valve at the car body side and to the non-contact type of the power supply to the control valve, the power supply system can be simplified.

(6) Thanks to the simple structure of the fluid clutch, it is possible to lighten the fluid clutch and to reduce the manufacture cost.

What is claimed is:

1. A fluid clutch comprising a sealed case mounted on a rotary shaft by bearings permitting relative rotation of said sealed case around said rotary shaft, a partition plate secured in said sealed case and dividing said sealed case into an oil supply chamber for accommodating a supply of oil and a torque transmission chamber, a drive disc secured to said rotary shaft and disposed in said torque transmission chamber in spaced relation to said sealed case and said partition plate, such that a torque transmission clearance is defined between the drive disc and both said sealed case and said partition plate, an oil discharge passage for discharging to said oil supply chamber oil recovered by a dam mechanism mounted on an inner circumferential surface of said torque transmission chamber of said sealed case and in opposed relationship to an outer circumferential wall of said drive disc, and an oil discharge port in said partition plate for delivering oil from said oil supply chamber to said torque transmission chamber, such that oil in said torque transmission chamber transmits drive torque of said drive disc to said sealed case, an electromagnetically acting passage control valve arranged coaxially with said rotary shaft between said discharge passage and said oil supply chamber for controlling the feeding of the recovered oil to said torque transmission chamber, bypass means interposed between said oil discharge passage and said oil supply chamber for allowing the oil to flow to the oil supply chamber in a sufficient quantity for preventing deterioration of the oil due to heat, said bypass means including a clearance formed between a valve member of said passage control valve and a seat face to be seated by said valve member.

2. A fluid clutch according to claim 1, wherein said dam mechanism has a generally U-shaped section.

3. A fluid clutch according to claim 1, wherein said bypass means further includes a bypass passage for providing the communication between the entrance of said passage control valve and said oil supply chamber.

4. A fluid clutch according to claim 1, wherein said passage control valve is a duty type solenoid valve, and wherein said bypass means is instantly released to effect the bypass by changing the duty ratio of said solenoid valve.

5. A fluid clutch according to claim 1, wherein said passage control valve is selected from the group consisting of a duty type solenoid valve, an on/off control type solenoid valve and a linear control type solenoid valve.

6. A fluid clutch according to claim 4, wherein said bypass means further includes a bypass passage for providing the communication between the entrance of said passage control valve and said oil supply chamber.

7. A fluid clutch comprising a sealed case mounted on a rotary shaft by bearings permitting relative rotation of said sealed case around said rotary shaft, a partition plate secured in said sealed case and dividing said sealed case into an oil supply chamber for accommodating a supply of oil and a torque transmission chamber, a drive disc secured to said rotary shaft and disposed in said torque transmission chamber in spaced relation to said sealed case and said partition plate, such that a torque transmission clearance is defined between the drive disc and both said sealed case and said partition plate, an oil discharge passage for discharging to said oil supply chamber oil recovered by a dam mechanism mounted on an inner circumferential surface of said torque transmission chamber of said sealed case and in opposed relationship to an outer circumferential wall of said drive disc, and an oil discharge port in said partition plate for delivering oil from said oil supply chamber to said torque transmission chamber, such that oil in said torque transmission chamber transmits drive torque of said drive disc to said sealed case, an electromagnetically acting passage control valve arranged coaxially with said rotary shaft between said discharge passage and said oil supply chamber for controlling the feeding of the recovered oil to said torque transmission chamber, bypass means interposed between said oil discharge passage and said oil supply chamber for allowing the oil to flow to the oil supply chamber in a sufficient quantity for preventing deterioration of the oil due to heat, said bypass means includes a groove formed between a valve member of said passage control valve and a seat face to be seated by said valve member.

8. A fluid clutch according to claim 7, wherein said dam mechanism has a generally U-shaped section.

9. A fluid clutch according to claim 7, wherein said passage control valve is a duty type solenoid valve, and wherein said bypass means is instantly released to effect the bypass by changing the duty ration of said solenoid valve.

10. A fluid clutch according to claim 7, wherein said passage control valve is selected from the group consisting of a duty type solenoid valve, an on/off control type solenoid valve, and a linear control type solenoid valve.

* * * * *